US008639386B2

(12) United States Patent
Summer et al.

(10) Patent No.: US 8,639,386 B2
(45) Date of Patent: Jan. 28, 2014

(54) HAPTIC DEVICE FOR MANIPULATOR AND VEHICLE CONTROL (75) Inventors: Matthew D. Summer, Melbourne, FL (US); Paul M. Bosscher, West Melbourne, FL (US); Loran J. Wilkinson, Palm Bay, FL (US); William S. Bowman, Melbourne, FL (US); John B. Rust, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 187 days.

(21) Appl. No.: 13/112,366

(22) Filed: May 20, 2011

(65) Prior Publication Data

US 2012/0294696 A1 Nov. 22, 2012

(51) Int. Cl.
 *G05B 15/00* (2006.01)
(52) U.S. Cl.
 USPC ............... 700/264; 700/245; 700/247; 701/2; 901/1; 901/2
(58) Field of Classification Search
 USPC .......................................... 180/333; 700/264
 See application file for complete search history.

(56) References Cited

U.S. PATENT DOCUMENTS

| | | |
|---|---|---|
| 3,280,991 A | 10/1966 | Melton |
| 3,637,092 A | 1/1972 | George et al. |
| 4,216,467 A | 8/1980 | Colston |
| 4,521,685 A | 6/1985 | Rebman |
| 4,604,016 A | 8/1986 | Joyce |

(Continued)

FOREIGN PATENT DOCUMENTS

| | | |
|---|---|---|
| EP | 0672507 A1 | 9/1995 |
| EP | 1 876 505 A1 | 1/2008 |

(Continued)

OTHER PUBLICATIONS

Zarrad, W., et al., "Stability and Transparency Analysis of a Haptic Feedback Controller for Medical Applications", Proceedings of the 46th IEEE Conference on Decision and Control : New Orleans, LA, Dec. 12-14, 2007, IEEE, Piscataway, NJ, USA, Dec. 1, 2007, pp. 5767-5772.

(Continued)

*Primary Examiner* — Behrang Badii
*Assistant Examiner* — Jerrah Edwards
(74) *Attorney, Agent, or Firm* — Fox Rothschild, LLP; Robert J. Sacco (57) ABSTRACT

An interface (101) for converting human control input gestures to telematic control signals includes a plurality of articulating arms (107, 108, 109) each mounted at a base end (113, 115, 117) to an interface base and coupled at an opposing end to a housing (106). The articulating arms are operable to permit linear translational movement of the housing in three orthogonal directions. At least one sensor (116) of a first kind is provided for measuring the linear translational movement. A pivot member (201) is disposed in the housing and is arranged to pivot about a single pivot point. A grip (102) is provided and is attached to the pivot member so that a user upon grasping the grip can cause the pivot to rotate within the housing. A button (118) is provided to switch between at least two modes, wherein when in a first mode control signals are used to control a vehicle base (502), and when in the second mode control signals are used to control a robotic arm (504) coupled to the vehicle base (502).

15 Claims, 6 Drawing Sheets

(56) References Cited

U.S. PATENT DOCUMENTS

| | | |
|---|---|---|
| 4,655,673 A | 4/1987 | Hawkes |
| 4,661,032 A | 4/1987 | Arai |
| 4,762,006 A | 8/1988 | Asakawa et al. |
| 4,791,588 A | 12/1988 | Onda et al. |
| 4,795,296 A | 1/1989 | Jau |
| 4,837,734 A | 6/1989 | Ichikawa et al. |
| 4,842,308 A | 6/1989 | Spotts |
| 4,853,874 A | 8/1989 | Iwamoto et al. |
| 4,860,215 A | 8/1989 | Seraji |
| 4,862,751 A | 9/1989 | Asakawa et al. |
| 4,893,981 A | 1/1990 | Yoshinada et al. |
| 5,004,391 A | 4/1991 | Burdea |
| 5,007,300 A | 4/1991 | Siva |
| 5,018,922 A | 5/1991 | Yoshinada et al. |
| 5,092,645 A | 3/1992 | Okada |
| 5,184,319 A | 2/1993 | Kramer |
| 5,193,963 A | 3/1993 | McAffee et al. |
| 5,231,693 A | 7/1993 | Backes et al. |
| 5,382,885 A | 1/1995 | Salcudean et al. |
| 5,451,924 A | 9/1995 | Massimino et al. |
| 5,508,596 A | 4/1996 | Olsen |
| 5,565,891 A | 10/1996 | Armstrong |
| 5,589,828 A | 12/1996 | Armstrong |
| 5,619,180 A | 4/1997 | Massimino et al. |
| 5,694,013 A | 12/1997 | Stewart et al. |
| 5,737,500 A | 4/1998 | Seraji et al. |
| 5,792,165 A | 8/1998 | Klieman et al. |
| 5,831,408 A | 11/1998 | Jacobus et al. |
| 6,028,593 A | 2/2000 | Rosenberg et al. |
| 6,047,610 A | 4/2000 | Stocco et al. |
| 6,084,587 A | 7/2000 | Tarr et al. |
| 6,088,017 A | 7/2000 | Tremblay et al. |
| 6,104,158 A | 8/2000 | Jacobus et al. |
| 6,184,868 B1 | 2/2001 | Shahoian et al. |
| 6,191,796 B1 | 2/2001 | Tarr |
| 6,246,390 B1 | 6/2001 | Rosenberg |
| 6,271,833 B1 | 8/2001 | Rosenberg et al. |
| 6,281,651 B1 | 8/2001 | Haanpaa et al. |
| 6,522,952 B1 | 2/2003 | Arai et al. |
| 6,535,793 B2 | 3/2003 | Allard |
| 6,636,161 B2 | 10/2003 | Rosenberg |
| 6,705,871 B1 | 3/2004 | Bevirt et al. |
| 6,781,569 B1 | 8/2004 | Gregorio et al. |
| 6,793,653 B2 | 9/2004 | Sanchez et al. |
| 6,801,008 B1 | 10/2004 | Jacobus et al. |
| 6,857,878 B1 | 2/2005 | Chosack et al. |
| 7,138,981 B2 | 11/2006 | Kim et al. |
| 7,158,112 B2 | 1/2007 | Rosenberg et al. |
| 7,168,748 B2 | 1/2007 | Townsend et al. |
| 7,225,404 B1 | 5/2007 | Zilles et al. |
| 7,345,672 B2 | 3/2008 | Jacobus et al. |
| 7,480,600 B2 | 1/2009 | Massie et al. |
| 7,714,895 B2 | 5/2010 | Pretlove et al. |
| 7,783,384 B2 | 8/2010 | Kraft |
| 8,226,072 B2 | 7/2012 | Murayama |
| 8,447,440 B2 | 5/2013 | Phillips et al. |
| 8,473,101 B2 | 6/2013 | Summer |
| 2001/0002098 A1 | 5/2001 | Haanpaa et al. |
| 2001/0037163 A1 | 11/2001 | Allard |
| 2003/0169235 A1 | 9/2003 | Gron et al. |
| 2004/0189675 A1 | 9/2004 | Pretlove et al. |
| 2004/0254771 A1 | 12/2004 | Riener et al. |
| 2005/0252329 A1 | 11/2005 | Demers |
| 2006/0048364 A1 | 3/2006 | Zhang et al. |
| 2006/0066574 A1* | 3/2006 | Kim et al. ............ 345/161 |
| 2007/0050139 A1 | 3/2007 | Sidman |
| 2007/0095582 A1 | 5/2007 | Stuijt et al. |
| 2008/0009971 A1 | 1/2008 | Kim et al. |
| 2008/0063400 A1* | 3/2008 | Hudson et al. ............ 398/106 |
| 2009/0182436 A1 | 7/2009 | Ferrara |
| 2010/0019890 A1* | 1/2010 | Helmer et al. ............ 340/407.1 |
| 2010/0041991 A1 | 2/2010 | Roundhill |
| 2010/0070079 A1 | 3/2010 | Mangaser et al. |
| 2010/0092267 A1* | 4/2010 | Najdovski et al. ............ 414/7 |
| 2010/0100256 A1 | 4/2010 | Jurmain et al. |
| 2010/0168918 A1 | 7/2010 | Zhao et al. |
| 2010/0169815 A1 | 7/2010 | Zhao et al. |
| 2011/0015569 A1 | 1/2011 | Kirschenman et al. |
| 2011/0046781 A1 | 2/2011 | Summer |
| 2011/0155785 A1 | 6/2011 | Laurent et al. |
| 2012/0185098 A1 | 7/2012 | Bosscher et al. |
| 2012/0185099 A1 | 7/2012 | Bosscher et al. |

FOREIGN PATENT DOCUMENTS

| | | |
|---|---|---|
| FR | 2 898 824 A1 | 9/2007 |
| GB | 2 228 783 A | 9/1990 |
| WO | 95 30571 A1 | 11/1995 |
| WO | 03 055061 A1 | 7/2003 |
| WO | 2006 016799 A1 | 2/2006 |
| WO | 2008 135978 | 11/2008 |
| WO | 2010 040215 A1 | 4/2010 |
| WO | 2010/085184 A1 | 7/2010 |
| WO | 2011075093 | 6/2011 |

OTHER PUBLICATIONS

Cheung, Y., et al., "Cooperative Control of a Multi-Arm System Using Semi-Autonomous Telemanipulations and Adaptive Impedance", Advanced Robotis, 2009. ICAR 2009. International Conference on, IEEE, Piscataway, NJ, USA, Jun. 22, 2009, pp. 1-7.

Suzuki, A., et al., "Performance conditioning of time delayed bilaterial teleoperation system by scaling down compensation value of communication disturbance observer", Advanced Motion Control, 2010, 11th IEEE International Conference on, IEEE, Piscataway, NJ, USA, Mar. 12, 2010, pp. 524-529.

Tzafestas, C., et al., "Adaptive impedance control in haptic teleoperation to improve transparency under time-delay", 2008 IEEE International Conference on Robotics and Automation. The Half-Day Workshop on: Towards Autonomous Agriculture of Tomorrow, IEEE—Piscataway, NJ, USA, Piscataway, NJ, USA, May 19, 2008, pp. 212-219.

International Search Report mailed May 23, 2012; Application Serial No. PCT/US2011/066873 in the name of Harris Corporation.

Everett L J et al; "Automatic Singularity Avoidance Using Joint Variations in Robot Task Modification", IEEE.Robotics & Automation Magazine, IEEE Service Center, Piscataway, NJ, US, vol. 1, No. 3, Sep. 1, 1994, pp. 13-19, XP011420425.

Jonghoon Park et al.: "Reconstruction of Inverse Kinematic Solution Subject to Joint Kinematic Limits Using Kinematic Redundancy", Intelligent Robots and Systems '96, IROS 96, Proceedings of the 1996 L EEE/RSJ International Conference on Osaka, Japan, Nov. 4-8, 1996, New York, NY, USA, IEEE, US, vol. 2, Nov. 4, 1996, pp. 425-430, XP010212433.

Hamid Abdi et al: "Joint Velocity Redistribution for Fault Tolerant Manipulators", Robotics Automation and Mechatronics (RAM), 2010 IEEE Conference On, IEEE, Piscataway, NJ, USA, Jun. 28, 2010, pp. 492-497, XP031710198.

International Search Report mailed Jun. 28, 2012, Application Serial No. PCT/US2012/027475 in the name of Harris Corporation.

Marshall, W.C., et al., "A Testbed for Deisgn of User-Friendly, Multiple-Degree-Of-Freedom, Manual Controllers", Scientific Honeyweller, Honeywell's Corporate. Minneapolis, US Jan. 1, 1993, pp. 78-86.

International Search Report dated Oct. 29, 2012; Application Serial No. PCT/US2012/034207 in the name of Harris Corporation.

International Search Report dated Jan. 15, 2013, Application Serial No. PCT/US2012/037751 in the name of Harris Corporation.

Information about Related Patents and Patent Applications, see section 6 of the accompanying Information Disclosure Statement Letter, which concerns Related Patents and Patent Applications. Mar. 30, 2012.

European Search Report mailed Mar. 14, 2012, Application Serial No. 11009319.2-2316, in the name of Harris Corporation.

Information about Related Patents and Patent Applications, see section 6 of the accompanying Information Disclosure Statement Letter, which concerns Related Patents and Patent Applications.

(56) References Cited

OTHER PUBLICATIONS

International Search Report mailed Jan. 4, 2013, International Application Serial No. PCT/US2012/058303 in the name of Harris Corporation.

Tas, NR, et al., "Technical Note: Design, fabrication and testing of laterally driven electrostatic motors employing walking motion and mechanical leverage", Journal of Micromechanics & Microengineering, Institute of Physics Publishing, Bristol, GB, vol. 13, No. 1, Jan. 1, 2003. N6-N15.

Rogers, Je., et al., "Bi-directional Gap Closing MEMS Actuator Using Timing and Control Techniques", IEEE Industrial Electronics, IECON 2006—32nd Annual Conference on, IEEE, Piscataway, NJ USA Nov. 1, 2006, pp. 3469-3154.

Alqasemi R et al: "Kinematics, control and redundancy resolution of a 9-DoF wheelchair-mounted robotic arm system for ADL tasks", Mechatronics and its Applications, 2009. ISMA '09. 6th International Symposium on, IEEE, Piscataway, NJ, USA, 23 Mar. 2009 (Mar. 23, 2009), pp. 1-7.

Tsumaki Y et al: "Design of a compact 6-DOF haptic interface", Robotics and Automation, 1998. Proceedings. 1998 IEEE International Conference on Leuven, Belgium May 16-20, 1998, New York, NY, USA, IEEE, US, vol. 3, May 16, 1998 (May 16, 1998), pp. 2580-2585.

Bley F et al: "Supervised navigation and manipulation for impaired wheelchair users", Systems, Man and Cybernetics, 2004 IEEE International Conference on, IEEE, Piscataway, NJ, USA, vol. 3, Oct. 10, 2004 (Oct. 10, 2004), pp. 2790-2796.

International Search Report mailed 2 May 2013, International Application No. PCT/US2012/051314, in the name of Harris Corporation.

\* cited by examiner

HAPTIC DEVICE FOR MANIPULATOR AND VEHICLE CONTROL

BACKGROUND OF THE INVENTION

1. Statement of the Technical Field

The inventive arrangements relate to telematic control systems and methods, and more particularly to a single haptic interface and related methods that can be used to control both a vehicle base and a robotic arm coupled to the vehicle base of a robotic system.

2. Description of the Related Art

Robotic systems are growing increasingly common for use in areas in which a human may be subjected to dangerous or otherwise unpleasant work environments. Such applications include explosive ordinance disposal, search and rescue missions, environmental analysis or inspection at toxic sites and the like. These robotic systems are typically controlled remotely and include a vehicle base and a robotic arm mounted onto the vehicle base. The vehicle base is used to bring the robotic arm into the proximity of a target location or target object, and then the target location or target object is inspected, manipulated or both using the robotic arm. Control units for teleoperation of robotic systems can sense control inputs provided by a user. These control inputs can be measured by one or more sensors and converted into corresponding signals that are transmitted to the robotic system to cause it to move in a desired manner in accordance with the transmitted signals. However, these control units are often broken up into a first unit that is used to control the vehicle base, and a second unit that is used to control the robotic arm.

With regards to the vehicle base, control is typically effectuated by way of one or more joysticks or their equivalents, such as button pads or the like. Such input devices are simple to use and understand, but also tend to exhibit coarse control of the vehicle base. For situations in which fine control of the movement of the vehicle base is required, the controller will often include a switch or the like that drops the vehicle base into a low-speed mode; control signals that would otherwise be imprecise at relatively high speeds can thus offer more finely grained control at these reduced speeds. This is, however, inconvenient for the user and, to a degree, requires training and familiarization at two speeds rather than one. By way of another method for controlling the vehicle base, U.S. Pat. No. 6,535,793 discloses a point-and-click navigation system and method.

With regards to the robotic arm, simple user interface systems can provide a separately operable control for each movable joint of a robot or robotic manipulator. More complex systems can include hand controllers (sometimes in the form of a pistol grip), which sense the movement by a user's hand. The hand controller generates one or more control signals which are then used for actuating various motion operations of the robotic arm. The control system of the robotic arm will respond to these control signals by activating certain servomotors, solenoids, or other devices within the robotic arm to produce the desired action.

Haptic technology or haptics involves tactile feedback provided by a device to a user. The tactile feedback is typically provided by applying forces, vibrations and/or motions to one or more portions of a user interface device. Haptics are sometimes used to enhance remote control devices associated with machines and virtual reality systems. For example, U.S. Pat. No. 5,831,408 to Jacobus et al. discloses that force feedback systems are sometimes used to communicate forces generated on a robotic hand back to a user, through a hand controller. Reference is also drawn to U.S. Pat. Nos. 7,345,672; 4,837,734; 4,893,981 and 5,004,391, which also disclose haptic teleoperation of a robotic arm. For the vehicle base, however, haptic feedback tends to be quite crude, if present at all, and generally involves simply buzzing or vibrating of the housing of the control pad to provide a signal, such as a warning that the vehicle base is in danger of tipping over or the like.

One drawback of prior art teleoperation devices is that they do not permit fine-grained control of both the vehicle base and the robotic arm using the same device. When a single input device is used for both purposes it tends to be very simply in nature, analogous to a gaming input device, and hence cannot make use of gross hand movements of the user. When a more complex controller is used, such a controller is always used to control only the robotic arm, and a separate, simpler device is then used to control the vehicle base. Hence, a user must switch between different input devices, offering different levels and types of precision, degrees of freedom and haptic feedback, when switching between manipulating the robotic arm and driving the vehicle base. Requiring two separate input systems increases system bulk and user training times.

SUMMARY OF THE INVENTION

The invention concerns a user interface having an input device for converting human control input gestures to telematic control signals which may then be used to control a robotic system. The interface may also optionally provide output data to the user, such as haptic feedback via the input device or visual data via a video monitor. The robotic system has a vehicle base and a robotic arm mounted to the vehicle base, and the telematic control signals are used to control both the vehicle base and the robotic arm. The input device is operable by the user to move in a plurality of orthogonal directions, and this single input device is used to control both the vehicle base and the robotic arm. In preferred embodiments the input device moves in both linear directions and angular directions. In a specific preferred embodiment the input device includes a plurality of articulating arms, each of which is mounted at a base end to a base of the interface and coupled at an opposing end to a housing. The articulating arms are operable for translational movement of the housing in three orthogonal directions. A pivot member is disposed in the housing and arranged to pitch, roll and yaw about a single pivot point, with a grip attached to the pivot member. At least one sensor measures the orthogonal movements of the input device. In a preferred embodiment this includes first sensors configured for measuring linear translational movement of the housing, and second sensors for measuring the roll, pitch and yaw movements of the pivot member.

A control unit is responsive to the sensor signals produced by the one or more sensors and generates corresponding output control signals configured to remotely control corresponding movement of the robotic system, including, for example, movement in three orthogonal linear directions, and roll, pitch and yaw movement. The control unit implements at least two states, which includes a first state in which the output control signals generated by the input device are configured to control the vehicle base and a second state in which the output control signals generated by the same input device are configured to control the robotic arm. A user actuated sensor is coupled to the control unit to cause the control unit to transition into the first state and the second state in response to user input. The user actuated sensor may be, for example, a button, switch, knob or input element on a touch screen display.

In preferred embodiments a touch-screen video display is mounted on the base and coupled to the control unit for displaying video data received from the robotic system and accepting user input via the touch-screen.

In preferred embodiments, when the control unit is in the first state the output control signals are configured to exclusively control the vehicle base. Conversely, when the control unit is in the second state the output control signals are configured to exclusively control the robotic arm. In some embodiments the control unit further comprises a third state in which the output control signals are configured to simultaneously control the vehicle base and the robotic arm.

In preferred embodiments the base further comprises at least one motive device for applying a force to the input device; in a specific embodiment the motive device applies a force to at least one of the articulating arms. The at least one motive device is used to provide haptic feedback to a user via the input device. Specifically, data received from the robotic system is used for controlling the force applied by at least one motive device to provide haptic feedback to the user of the interface. In some embodiments the data received from the robotic system relates to a tilt direction and magnitude of the vehicle base, and haptic feedback is generated accordingly. In other embodiments the data received from the robotic system relates to a distance and direction of an object sensed by the robotic system, and haptic feedback is generated accordingly.

The invention also concerns a method for converting human control input gestures to telematic control signals suitable to control both a vehicle base and a robotic arm of a robotic system. The method involves determining movement of an input device in a plurality of orthogonal directions; in preferred embodiments these directions include three orthogonal linear directions, as well as roll, pitch and yaw motion. At least a portion of the movement information is then used to generate corresponding output control signals. One of at least two states is selected to control the robotic system, wherein when in a first state the output control signals are generated to control the vehicle base of the robotic system and when in the second state the output control signals are generated to control the robotic arm of the robotic system. The output control signals are then transmitted to the robotic system.

In preferred embodiments when in the first state the output control signals are used to exclusively control the vehicle base, whereas when in the second state the output control signals are used to exclusively control the robotic arm. A third state can also be provided in which the output control signals are used to simultaneously control the vehicle base and the robotic arm.

In preferred embodiments the method further comprises applying a force to the input device to provide haptic feedback related to the robotic system to a user. The haptic feedback can, for example, relate to a tilt direction and magnitude of the vehicle base or to a distance and direction of an object sensed by the robotic system.

In some embodiments the method further comprises utilizing a point-of-view of an image presented on a video display to generate the output control signals in accordance with the point-of-view.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and are provided merely to illustrate the invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown or discussed in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The present invention concerns control interfaces for unmanned robotic systems, including haptic control interfaces, which are capable of remotely controlling both a vehicle base and a robotic arm coupled to the vehicle base; the controller may provide as many as six directions (three orthogonal linear directions, and three orthogonal axes of rotation) for user input, which may then be correspondingly used to control the robotic arm, vehicle base, or both at the same time. The single control interface provides improvements over similar controllers of the prior art that employ two separate systems, while also permitting use of a single, sophisticated controller to drive the vehicle base. The present invention is a departure from such conventional arrangements insofar as it uses a single input device operable by a user to obtain gross hand movement information in a plurality of orthogonal directions, which information is then used to control both the vehicle base and the robotic arm. In preferred embodiments the input device comprises a combination of articulating arms that support a housing. The articulating arms are mounted to a base by means of a hinge and the angular rotation of the hinge is measured to determine linear translation movement of the housing. This arrangement is coupled with a ball and socket type pivot arrangement provided in the housing. The ball and pivot arrangement are used to determine rotation of a grip (roll, pitch, yaw) relative to the base. The ball and pivot arrangement provides a means for measuring relative rotation of the grip about the housing. The base includes a switch then permits toggling between a vehicle control mode and a robotic arm control mode; in some embodiments a third mode may be provided, in which user inputs obtained from this single input device are processed to simultaneously control both the vehicle base and the robotic arm. The base also preferably includes a video display to present video data broadcast by the unmanned robotic system. Consequently a more compact control interface is provided, at lower cost, without the need for carrying about two separate user input interfaces or sacrificing precision control capabilities. These and other inventive features will become more apparent as the discussion progresses.

Figure 1:
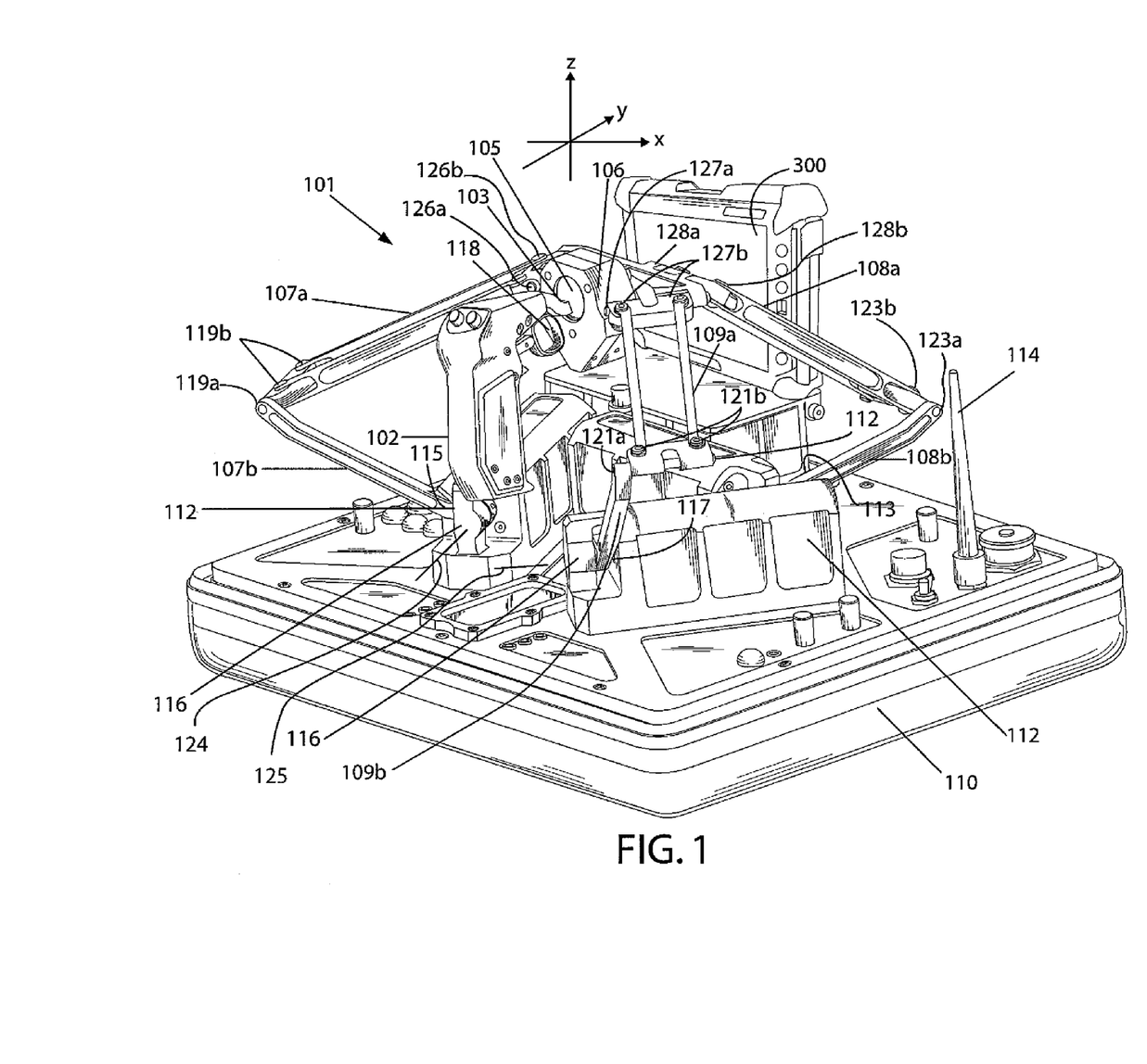
FIG. 1 is drawing which shows an interface for remotely controlling a robotic system.

Referring now to FIG. 1, there is shown an interface 101 for converting human control input gestures to telematic control signals that are transmitted to a robotic system to control all operations of the robotic system, including the vehicle base and a robotic arm mounted to the vehicle base. The interface 101 includes an input device have a plurality of articulating arms 107a, 107b, 108a, 108b, and 109a, 109b, each mounted at a base end 113, 115, 117 to an interface base 110 and coupled at an opposing end to a housing 106. Each base end 113, 115, 117 pivots on a single defined axis (e.g. 124, 125) in a hinge-like manner. The articulating arms 107a-109b are assembled from a plurality of gimbal joints which are operable to permit translational movement of the housing 106 in three orthogonal directions (x, y and z). More particularly, a center portion of the articulating arms 107a-109b can comprise a plurality of joints 119a, 119b, joints 121a, 121b, and joints 123a, 123b which permit arm rotation about two transverse axes. At a housing end of the arms joints 126a, 126b, 127a, 127b, and 128a, 128b also permit rotation about two transverse axes. The arrangement of the arms and related joints permit linear translation movement of housing 106 with respect to the x, y, and z orthogonal axes.

In preferred embodiments, while the joints of the articulating arms are arranged to permit such linear translational movement, they are arranged such that the housing 106 is prevented from rotating. In other words, pitch, roll and yaw of the housing 106 is generally precluded by the attachment of the articulating arms 107a, 107b, 108a, 108b, and 109a, 109b to the housing. This type of mechanism is known in the art as a "Delta" mechanism, and the translation-only behavior of the housing has been shown in Clavel, R., "Conception d'un robot parallèle rapide à 4 degrés de liberté," Ph.D. Thesis, EPFL, Lausanne, Switzerland, 1991.

At least one sensor of a first type is provided for measuring the linear translational movement of the housing 106. Any suitable means may be employed to generate the current x, y and z movement information of the housing 106 with respect to a reference frame defined by the base 110, including both optical and electro-mechanical sensors. By way of example, in one embodiment the first type sensors are a plurality of angle sensors 116 employed to respectively determine the angular movement of each joint. For example, one group of angle sensors 116 may determine the respective angular positions of the base ends 113, 115, 117 with respect to the base 110. Another group of angle sensors 116 may measure the angle of the joints 119a, 121a, 123a, while another group measures the angles of the joints 119b, 121b, 123b. Knowledge of the location of each joint 113, 115, 117 directly coupled to the base 110 combined with knowledge of the lengths of the arms 107a-109b and the angular positions of the joints 119, 121, 123 can be used to compute the location, movement or both of the housing 106 with respect to the base 110, using known trigonometric functions. Determining the movement, position or both of the housing 106 from the angle measurements provided by the joint angle sensors 116 is known in the art (see Clavel 1991). It should be understood that this is only one possible method of measuring the translational movement of the housing 106 and the invention is not limited with respect to the measurement method used.

A pivot member is disposed in the housing 106 and is arranged to pivot with regard to three angular axes about a single pivot point. In other words, the pivot member is configured to roll, pitch and yaw about the pivot point. Any suitable mechanical arrangement can be used to form such a pivot member. However, in a preferred embodiment, the pivot member can comprise a ball 105 including a ball surface which is at least partially spherical. The housing 106 can include a socket member for receiving the ball 105. A ball and socket arranged of this kind is described in further detail with respect to FIGS. 2A and 2B. A pin 103 is fixed to ball 105 and extends in a generally radial direction from the ball 105. The pin 103 is securely attached at one end to a grip 102 so that movement of the grip 102 is communicated to the ball 105. It will be appreciated that grip 102 is provided and is attached to the pivot member so that a user, upon grasping the grip 102, can cause the pivot member to rotate within the housing 106.

One or more second type sensors (not shown in FIG. 1) are mounted within housing 106 and can detect rotational motion of the ball 105 with regard to as many as three orthogonal axes (i.e., pitch, roll and yaw). The second type sensors can be any type sensor which is suitable to generate output signals which in combination allow the speed, direction or both of rotation of the ball 105 to be determined.

Output signals from the first and second type sensors are advantageously used to generate data regarding movement of the grip 102 with regard to any one of six directions. This data is then used to generate output control signals for a robotic system, as discussed in more detail below. More particularly, a control unit is provided which is responsive to a plurality of sensor signals produced by the first and second type sensors for generating output control signals. In some embodiments, this control unit can be disposed within the base 110. The output control signals generated by the control unit are configured to remotely control both the vehicle base and robotic arm of an unmanned robotic system.

The interface 101 preferably includes a display 300 that is used to present video information received from the robotic system. In preferred embodiments the display 300 is hinged to the base 110 so that it may be flipped up or down so as to adjust viewing angles and provide a more compact arrangement when not in use. The display 300 is also preferably a touch-screen display, as known in the art, so that the display 300 may also be used as a user input device.

The interface 101 advantageously includes a user actuated sensor 118 such as a button, switch, knob or the like for selectively transitioning the control unit between one of at least two states, as discussed in more detail below. For purposes of the following, the term "button" is used with respect to user actuated input device 118, but it will be appreciated that the term "button" is intended to encompass any suitable type of device, real or virtual, that enables the user to generate signals indicating the switching of the control unit into another state. For example, a knob with positions for each state may be employed as the "button" (i.e., user actuated sensor) 118 to generate appropriate state information. In some embodiments, the button 118 can be disposed on the grip 102, whereas in other embodiments it may be disposed on the base 110, as shown in FIG. 1. Still, the invention is not limited in this regard and the button 118 could be located on a different portion of the interface 101. For example, the button 118 could be virtual as a button, drop-down box, radio button or the like on the touch screen 300, which can be controlled by the control unit in a standard manner. In this case, a virtual button 118 is provided by suitable program code 420 (discussed below) to present the button 118 on the display 300 and generate button press or button state information when the user presses or touches the virtual button 118.

A first of these states, as set by the button 118, instructs the control unit to utilize the output control signals obtained from the first and second type sensor signals to generate corresponding vehicle base movement commands. These can be exclusive commands, excluding the robotic arm, so that when in the first state only the vehicle base is controlled and not the robotic arm. When in the first state as selected by button 118 all or a portion of the translational (3-axis, x, y and z) and rotational (3-axis, roll, pitch and yaw) movement information of the housing 106 is used to remotely control movement of the vehicle base.

A second of these states instructs the control unit to utilize the first and second type sensor signals to generate corresponding robotic arm movement commands. These can also be exclusive commands, excluding the vehicle base, so that when in the second state only the robotic arm is controlled and not the vehicle base. Hence, in the second state as selected by button 118 all or a portion of the translational (3-axis, x, y and z) and rotational (3-axis, roll, pitch and yaw) movement information of the housing 106 is used to remotely control movement of the robotic arm attached to the vehicle base.

The control unit is advantageously configured such that it provides the output control signals as a function of the movement information obtained from the input device, i.e., the movement information of the housing 106, and the current state as set by mode button 118. This configuration permits a single input device (i.e., from user point of view grip 102) on the interface 101 to control both the vehicle base and the robotic arm coupled to the vehicle base. In some embodiments the control may be exclusive, so that only one of the vehicle base and the robotic arm can be controlled at a time. In other embodiments, the vehicle base and robotic arm can be controlled simultaneously.

Figure 2A:
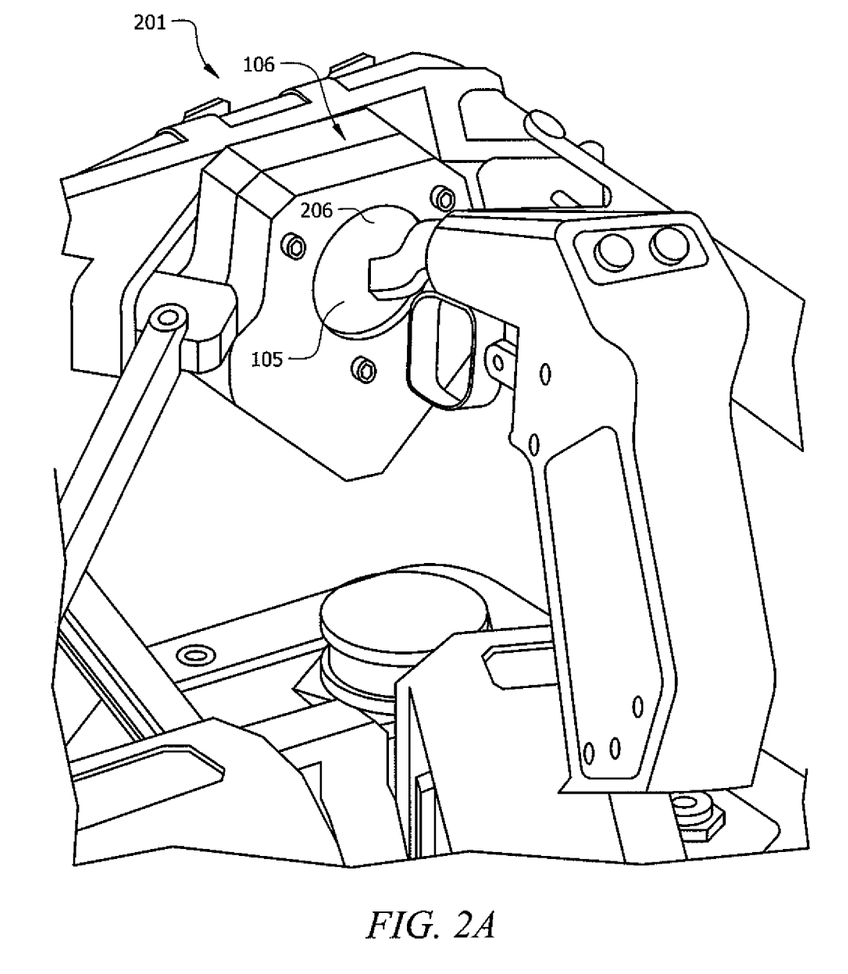
FIGS. 2*a* and 2*b* are show an enlarged portion of the control interface in FIG. 1.
Figure 2B:
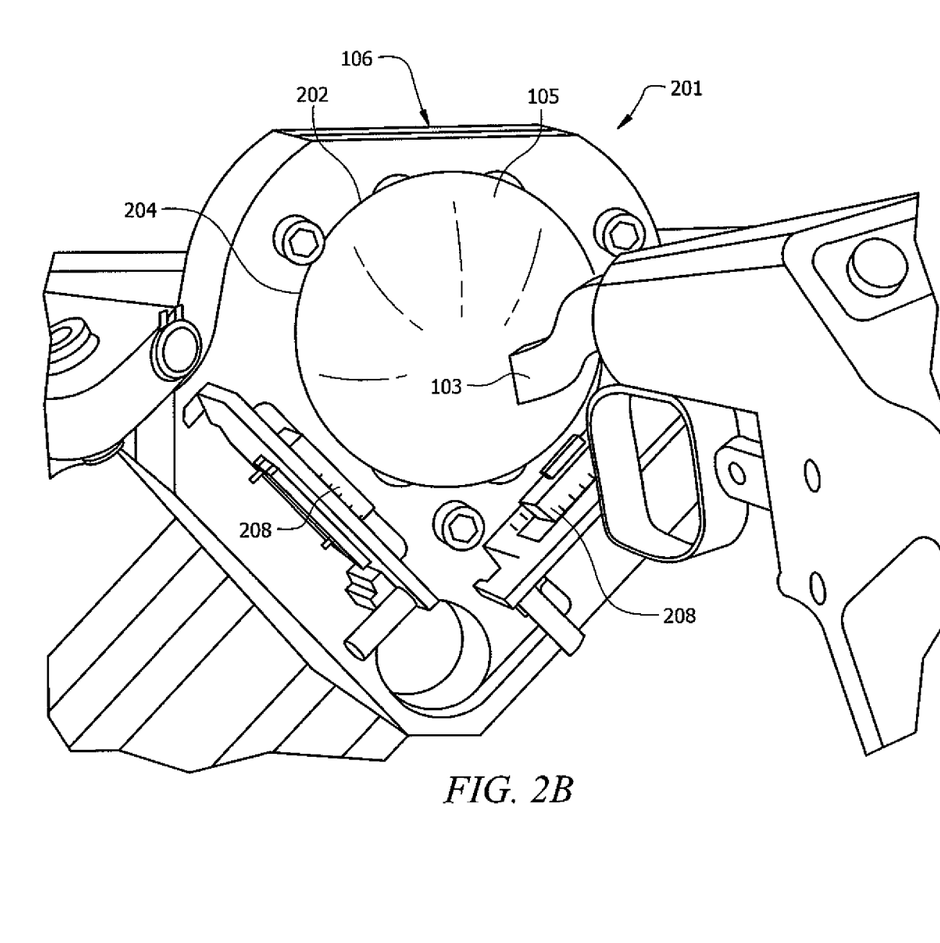

Referring now to FIGS. 2A and 2B, one embodiment of a pivot member and related structure is shown in greater detail. The pivot member includes housing 106 and ball 105 mounted therein so as to form a ball joint 201. The housing 106 is shown partially cut away in FIG. 2B to reveal a socket 202 defined within the housing 106 that is configured to accept ball 105. The socket 202 is at least partially spherical in shape. In preferred embodiments the ball 105 has a shape that is at least partially spherical in shape. The pivot member can pivot about a spherical center of the ball 105. In some embodiments, the external surface of the ball 105 is in direct mechanical contact or engagement with an inner surface 204 defined by the socket 202. As can be observed in FIG. 2B, the ball 105 is generally conformal to the inner surface 204 of the socket 202 and preferably fits snugly within the inner surface 204. According to some embodiments, the inner surface 204 forms a conjugate surface with respect to the outer surface of ball 105.

The housing 106 has an opening 206, which in some embodiments is circular; although it will be appreciated that other shapes can be used. Such an arrangement can be useful when desiring to limit movement of the ball 105 to an extent defined by the opening 206. The pin 103 extends through the opening 206 as shown. In some embodiments, the diameter of the opening 206 is advantageously formed somewhat smaller than the diameter of the ball 105 in order to retain the ball 105 inside the socket 202. In other embodiments, the size of the opening 206 can be larger than the diameter of the ball 105, and the ball joint 201 can further include a sealing cup (not shown) fitted around the opening 206 and having an opening that is smaller than the diameter of the ball 105. In some embodiments the sealing cup can be tapered in shape and sealingly connect with the sidewall of the pin 103 so as to provide a protective cover that prevents debris from entering into the opening 206. The housing opening 206, the opening in the sealing cup, or both are dimensioned to allow the ball 105 to freely rotate within the limits defined by opening 206, the sealing cup, or both. In other words the ball 105 can roll, pitch and yaw within the socket 202.

The inner surface 204 can include a bearing surface (not shown) disposed inside the socket 202 to facilitate movement of the ball 105 in relation to the housing 106. The bearing surface in such embodiments can be detachably connected to the housing 106 or can be an integral part of the housing 106. The bearing surface can reduce friction between the ball 105 and the housing 106, which decreases wear and tear of the parts and extends the useful life of the ball joint 201. Preferably, the bearing surface is a low friction lining disposed between the socket 202 and the ball 105. However, other known means for reducing friction, such as bearings or fluids, can also be used to reduce friction in the devices disclosed herein instead of or in addition to the low friction lining.

Sensors 208 are provided for sensing and measuring the movement of the ball 105 relative to the housing 106. The sensors 208 are arranged so that they are collectively able to sense and measure rotation of the ball 105 with respect to as many as three orthogonal axes (roll, pitch and yaw). In preferred embodiments, the ball joint 201 includes at least two sensors 208. Each sensor 208 is preferably capable of sensing ball rotation in at least two orthogonal directions. When two or more sensors 208 are used in this way, it is preferable that they are spaced apart around the circumference of the ball 105 as shown. Such angular spacing can ensure that there is no ambiguity in the sensed rotation direction of the ball 105. According to some embodiments, the sensors 208 can be spaced apart by an angle of about 90° with respect to the center of the ball 105, but of course the invention is not limited in this regard. Optical sensors are particularly well suited for this purpose, but any sensor type may be employed, provided that it is capable of performing as described herein.

The first type sensors 116 and second type sensors 208, are electrically connected to control circuitry disposed, for example, in base 110 of the interface 101. Such control circuitry advantageously generates movement data for grip 102 by using information concerning rotation of ball 105 within the housing 106 and information regarding the movement of the articulating arms 107b, 108b, and 109b. This information is then used to generate control signals for controlling the robotic system, including both the vehicle base and the robotic arm. A data link can be used for the purpose of communicating motion control command signals to the robotic system. In some embodiments, interface 101 can have an integrated data transceiver contained therein. If a wireless data transceiver is used for this purpose, the control unit 101 can include an antenna 114. Wired connections with the robotic system are also possible, however.

Figure 3:
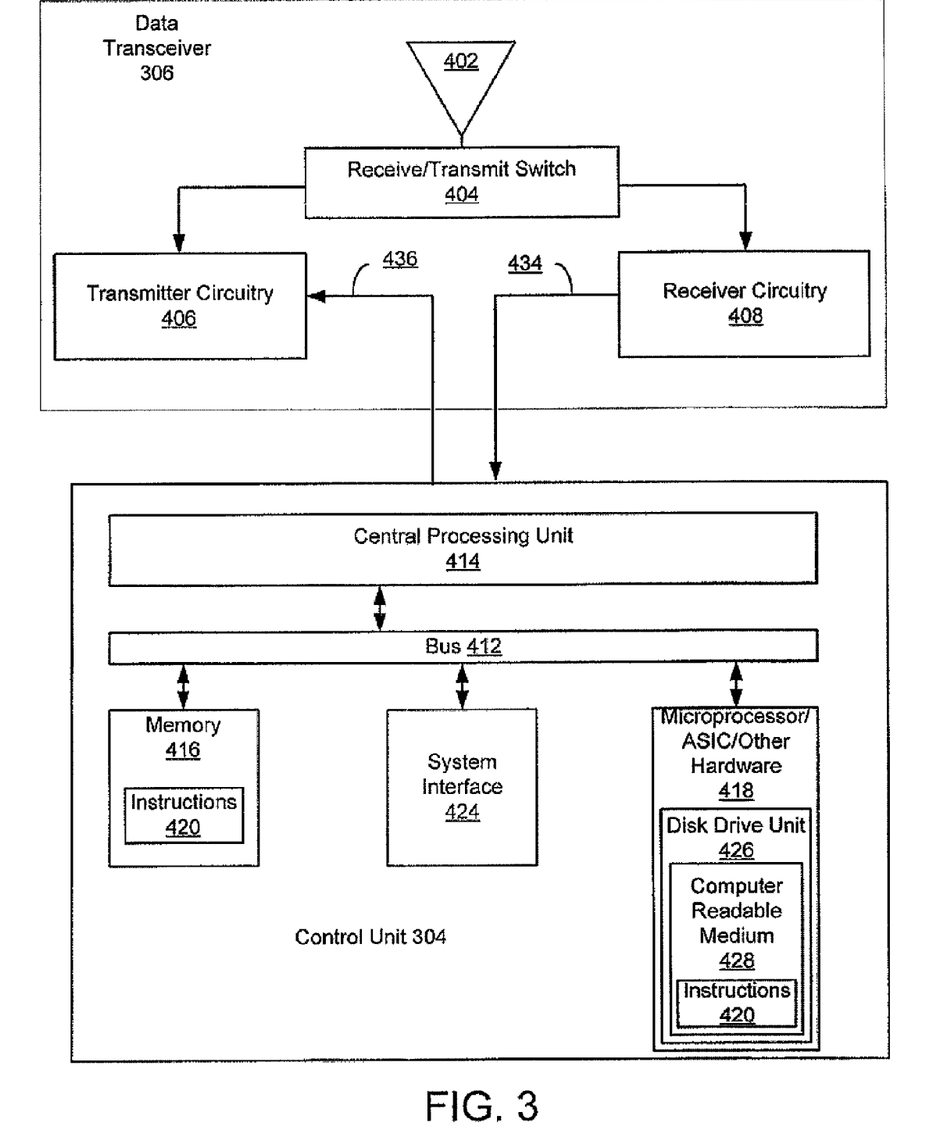
FIG. 3 is a block diagram which is useful for understanding a control unit for the interface in FIG. 1.

Referring now to FIG. 3, there is shown an embodiment control unit 304 which can be used in the present invention. As shown in FIG. 3, the control unit 304 comprises a system interface 424, a Central Processing Unit (CPU) 414, a system bus 412, a memory 416 connected to and accessible by other portions of the control unit 304 through system bus 412, and hardware entities 418 connected to system bus 412. System interface 424 allows the control unit 304 to receive data from first and second type sensors 116, 208 and from mode control button 118. Additionally, system interface can permit the control unit 304 to control the touch screen display 300 and receive input from the touch screen display 300. The system interface 424 can also permit the control unit 304 to monitor one or more additional function controls associated with the interface 424. The system interface 424 can also be configured to allow control unit 304 to communicate with data transceiver 306, network equipment and other computing devices via a wired, wireless or both communications link or links. At least some of the hardware entities 418 perform actions involving access to and use of memory 416, which may be a random access memory (RAM), a disk drive, and/or a compact disc read only memory (CD-ROM).

Hardware entities 418 can include microprocessors, application specific integrated circuits (ASICs) and other hardware. Hardware entities 418 may include a microprocessor programmed for facilitating the provision of data communication services and robot control processing as described herein. In this regard, it should be understood that the microprocessor can access and run telematic control processing as described herein. The communication operations can include, but are not limited to, signal receiving operations, signal processing operations, signal generation operations, and signal communication operations. Such communication operations can facilitate communications with a remote device or object to facilitate motion control of such object.

As shown in FIG. 3, the hardware entities 418 can include a disk drive unit 426 or other non-volatile memory (e.g., flash memory) comprising a computer-readable storage medium 428 on which is stored one or more sets of instructions 420 (e.g., software code) configured to implement one or more of the methodologies, procedures, or functions described herein. The instructions 420 can also reside, completely or at least partially, within the memory 416 and/or within the CPU 414 during execution thereof by the data transceiver 306. The memory 416 and the CPU 414 also can constitute machine-readable media. The term "machine-readable media", as used herein, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution that cause the control unit 304 to perform any one or more of the methodologies of the present disclosure. As evident from the above discussion, the control unit 304 implements one or more method embodiments of the present invention, and in particular enables a user to manipulate the housing 106 to control movement of both a robotic vehicle base and a robotic arm attached to the vehicle base.

In some embodiments, it can be advantageous for the interface 101 to communicate with a robotic vehicle using a wired or wireless connection. A suitable data transceiver can be used for this purpose. For example, if a wireless connection is preferred, a data transceiver 306 can be provided. Notably, the data transceiver 306 may include more or less components than those shown in FIG. 3. However, the components shown are sufficient to disclose an illustrative embodiment implementing the present invention.

The data transceiver 306 comprises an antenna 402 (shown as element 114 in FIG. 1) for receiving and transmitting Radio Frequency (RF) signals. A receive/transmit (Rx/Tx) switch 404 selectively couples the antenna 402 to the transmitter circuitry 406 and receiver circuitry 408 in a manner familiar to those skilled in the art. The receiver circuitry 408 decodes the RF signals received from the robotic system to derive information therefrom; this can include video information and telemetry information, which can be processed and provided as visual data on the screen 300 and haptic information for the housing 106, respectively. The receiver circuitry 408 is coupled to control unit 304 via an electrical connection 434. The receiver circuitry 408 provides decoded RF signal information to the control unit 304. The control unit 304 uses the decoded RF signal information in accordance with the function(s) of the invention as described herein. The user interface 101, control unit 304, and data transceiver 306 can together comprise a telematic control system.

Figure 4:
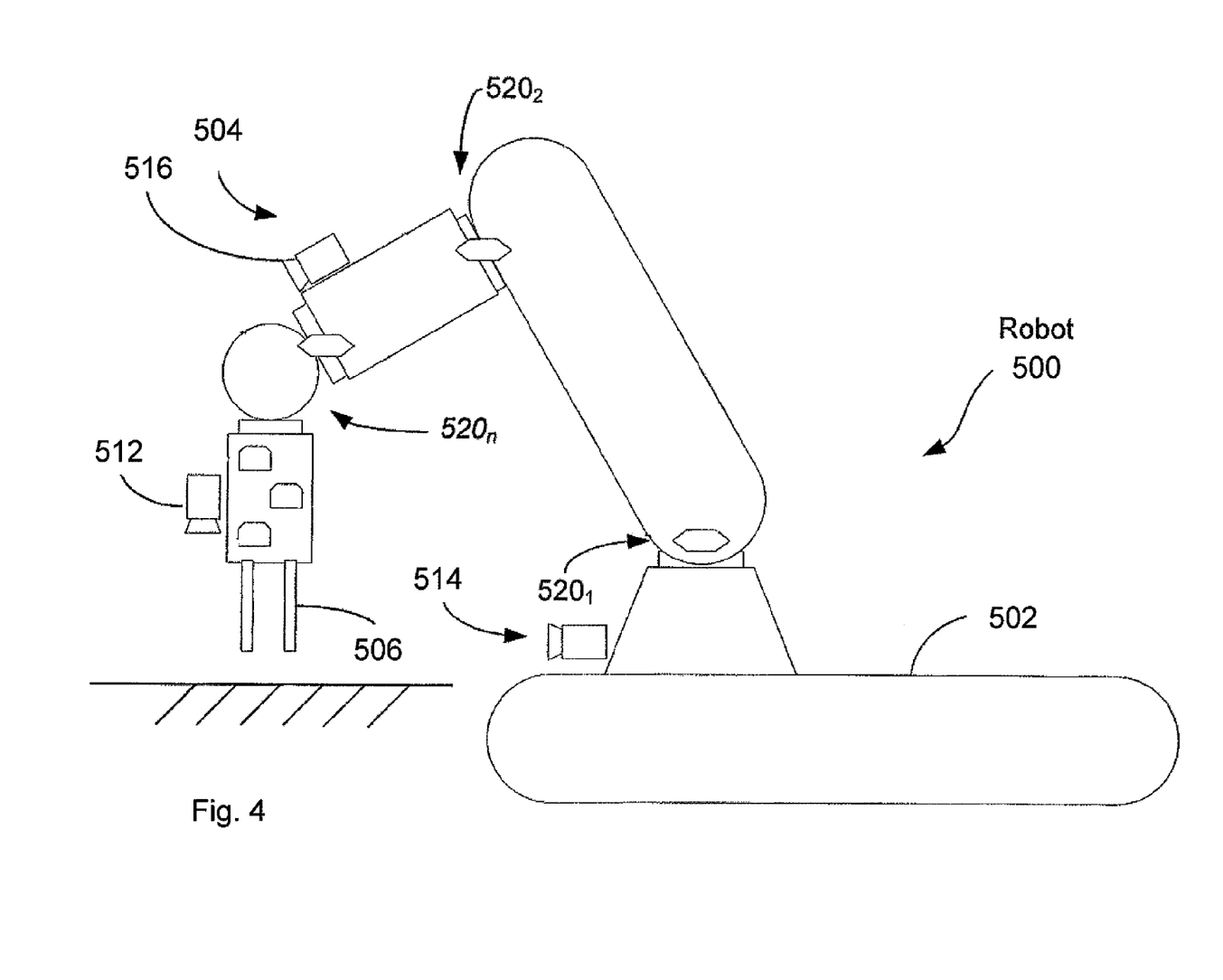
FIG. 4 illustrates an unmanned robotic system having a vehicle base and a robotic arm.

With further reference to FIG. 4, the telematic control system described above can be used for generating output control signals that are sent to an unmanned robotic system 500 to control both a vehicle base 502 and robotic arm 504 of the robotic system 500. For purposes of the following it should be understood that the robotic system 500 can be both an actual physical device and also exist within a virtual environment such a computer simulation or a computer game. In such cases, the control signals generated by the telematic control system can be used by a computer simulation or gaming system to produce apparent motion of the vehicle base 502 and robotic arm 504. Such objects within a virtual environment can be understood as a robotic systems for purposes of the present invention.

One or more actuators, motors or servo motors (not shown) can be disposed in relation to the input device to provide haptic feedback via the input device, such as via grip 102. For example, actuators or the like in the controller base 110 can apply a force to the articulating arms 107b, 108b, and 109b, which is then experienced in the grip 102. More particularly, such actuators or motors can be disposed in motor housings 112 which are provided as part of base 110. The force generated by the motors is used to provide haptic feedback to the user. Additional actuators for providing haptic feedback to a user can be provided within grip 102 itself. For example, such an actuator can exert a force upon a trigger 199. The control unit 304 in such embodiments receives haptic sensor signals from the robotic system 500. In particular, such sensor signals can indicate, for example, forces exerted upon the robotic arm 504. Or, when driving he vehicle base 502, such forces could indicate whether the vehicle base 502 is in danger of tipping over and the direction of such tipping; indicate resistance perceived by the vehicle base 502 (such as obtained from drive train motors) in advancing; or the presence and direction of obstacles as sensed by the robotic system 500. When received by the control unit 304, these sensor signals are used to control the actuators in base 110 for applying a force to the articulating arms 107b, 108b, and 109b.

Figure 5:
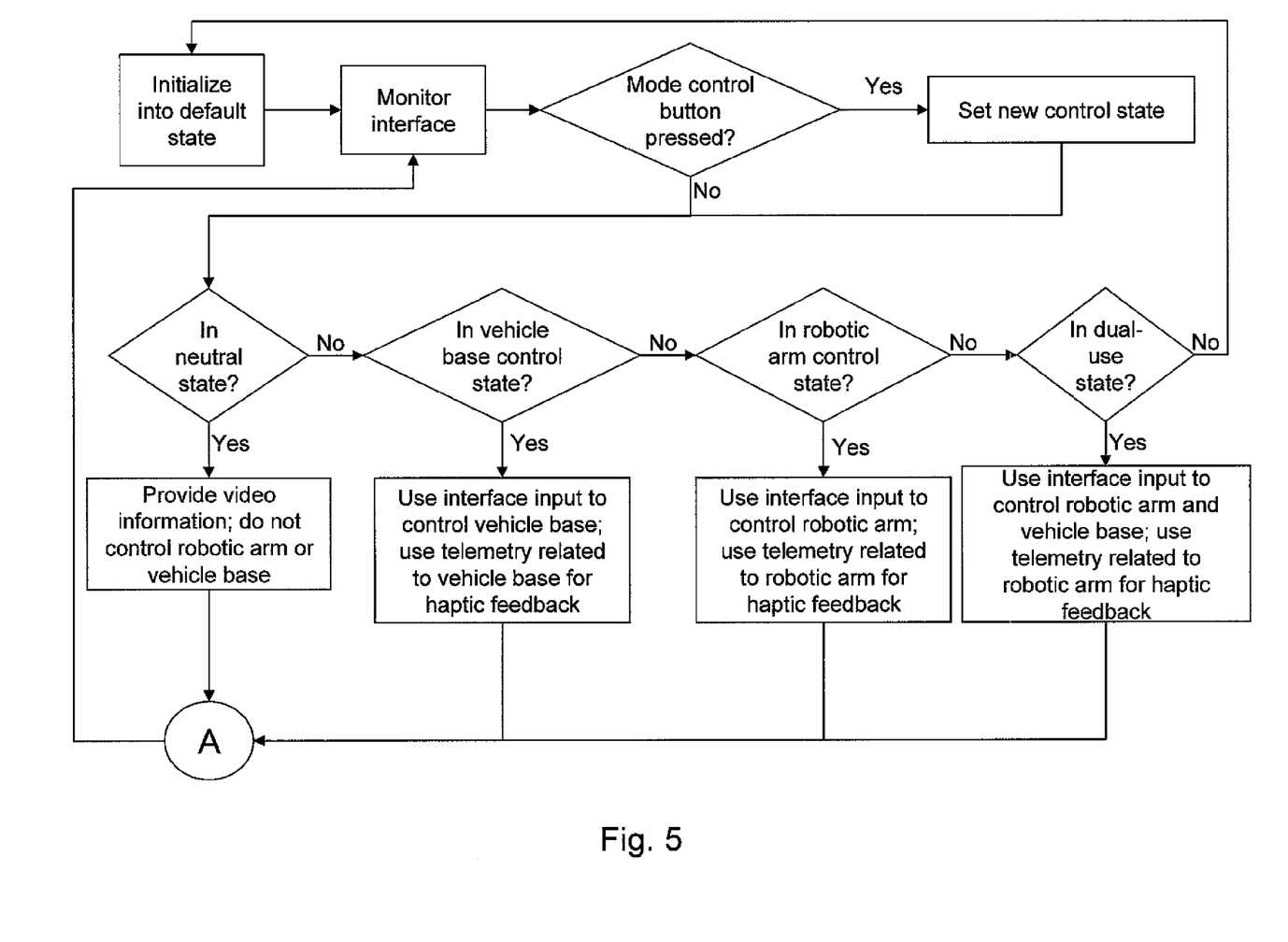
FIG. 5 is a flow chart for an embodiment control interface.

Referring now to FIG. 5, an embodiment method for controlling the robotic system 500 is discussed, which may be encoded by the instructions 420 to cause the CPU 414 to perform the following steps. On entry, such as when first turned on, the interface 101 can initiate into a default state. For safety, this can be a "do nothing" neutral state, in which no output control signals are sent to the robotic system 500 to cause movement of the vehicle base 502 or robotic arm 504. The control unit 304 monitors the mode control button 118, and when pressed causes the control unit 304 to, for example, cycle into the next control state, or selects the control state indicated by the button 118. By way of example, using a cycling method, if in the first "do nothing" state, pressing the mode control button 118 can cause the control unit 304 to cycle into a vehicle base control state. When in the vehicle base control state, pressing the mode control button 118 can cause the control unit 304 to cycle into a robotic arm control state. When in the robotic arm control state, pressing the mode control button 118 can cause the control unit 304 to cycle into a dual-use state. Finally, when in the dual-use state, pressing the mode control button 118 can cause the control unit 304 to cycle into the neutral state or, in another embodiment, into the vehicle base control state. Of course, other state configurations are possible.

While in the neutral state, although the control unit 304 may monitor the housing 106 and generate corresponding translational and rotational movement information from the housing 106, the control unit 304 does not send any corresponding output control signals or commands to the robotic system 500 that would activate the robotic arm 504 or vehicle base 502. On the other hand, the control unit 304 may received video data from one or more video cameras 512, 514, 516 mounted on the robotic system 500 and display this video data on the display 300.

While in the vehicle base control state, the control unit 304 continuously monitors the translational and rotational movement of the housing 106 to generate output control signals that control the absolute position or velocity of the vehicle base 502. With velocity-based control the control unit 304 generates output control signals for vehicle base movement control and, using the transceiver 306, sends those output control signals to the robotic system 500 which reacts accordingly to set and change the vehicle base 502 velocity in accordance with the movement information obtained form the housing 106. By way of example, the magnitude of the displacement of the housing 106 along the Y-axis may determine how fast the vehicle base 502 moves in the forward or reverse directions, where displacement in the +Y direction (forward) causes forward movement of the vehicle base. The magnitude of the displacement of the housing 106 along the X-axis may determine how sharply the vehicle base 502 turns in the left or right directions, where displacement in the +X direction (right) causes the vehicle base to steer right. For vehicle bases with additional mobility features (e.g. tracked flippers), the magnitude of the displacement of the housing 106 along the Z-axis may determine how these additional mobility features are moved. For example, on a vehicle base with flippers, displacement in the +Z direction (up) causes the vehicle's flippers to rotate up. Additional controllable elements of the vehicle base (e.g. pan-tilt-zoom cameras) may be controlled utilizing measurements of the rotational motion of the ball 105. The benefit of velocity-based control is that it provides for rapid and intuitive positioning of the vehicle base 502.

In other embodiments, while in the vehicle base control state, the control unit 304 uses the movement information of the housing 106 to generate output control signals that control the absolute position of the vehicle base 502 with respect to displacement from a geographic location. For example, the magnitude of displacement of the housing 106 along the Y-axis may determine how far the vehicle base 502 moves forward or backward from a set geographical point. In such a scenario, for example, the user would hold down a button on the handle to engage control of the robot and, while holding the button, push the handle in the +Y direction (forward). This displacement would be commanded to the vehicle and it would move forward to a new position forward of its original position, proportional to the displacement of the input device. Similarly, the user could move the handle in the +X direction (right). The vehicle would then steer to the right such that the change in steering angle is proportional to the handle movement. Similar behaviors can be attained for additional controllable aspects of the vehicle (flipper angles, camera pointing angles, etc.). The benefit of absolute positioning is that is gives the user fine control of the positioning of the vehicle base 502, which may not be possible using velocity-based control. In some embodiments, the control unit 304 may include a button or the like to indicate transitions between velocity control and absolute position control of the vehicle base 502. In some embodiments, the user interface includes a button (or similar control input) that allows the user to adjust a scale factor to control the proportionality between displacement of the handle and the corresponding movement of the vehicle.

When in the vehicle base control mode, whether in the velocity control mode or the absolute position control mode, the control unit 304 receives haptic information from the robotic system 500 and uses this haptic information to control forces on the articulating arms 107a, 107b, 108a, 108b, and 109a, 109b that can be experienced by the user via housing 106. In preferred embodiments, this haptic information relates to the vehicle base 502, and is designed to assist the user in driving the vehicle base 502. For example, if the robotic system 500 has sensors that indicate the degree and direction of tilt of the vehicle base 502, the haptic information may apply corresponding forces against the housing 106, where the direction and magnitude of the applied force indicates the magnitude and direction of the tilt of the vehicle base 502. Or, if a command as input via the housing 106 is likely to cause the vehicle base 502 to tip over, the user may feel a corresponding resistance against the housing 106. In some embodiments the robotic system 500 may include proximity sensors, as known in the art, to detect obstacles. In such embodiments, the haptic feedback may create a force on the housing 106 in the direction at which an obstacle is sensed by the robotic system 500, in which the magnitude of the haptic feedback force indicates the proximity or closeness of the detected obstacle. In such embodiments, the user would thus feel a "force field" effect while moving the housing 106 to drive the vehicle base 502 that indicates the direction and proximity of detected obstacles.

Additionally, while in the vehicle base control mode, the control unit 304 may receive one or more video streams from the robotic system 500 and present one or more of these streams on the video display 300, thus providing a visual framework with which the user may control movement of the vehicle base 502. When in this mode, the control unit 304 may default to a predetermined video stream for presentation on the display 300, such as a video feed from a video camera 514 mounted in a forward-facing direction on the vehicle base 502. In preferred embodiments, the user can, however, switch to using different video feeds from other cameras mounted on the robotic system 500.

In certain embodiments, the output control signals sent by the control unit 304 to control movement of the vehicle base 502 may depend upon the particular video feed presented to the user on the display 300. More specifically, how translational and rotational movement of the housing 106 is converted into corresponding output control signals for the vehicle base 502 can vary as a function of the camera view angle presented on the display 300. Similarly, the perceived direction of haptic feedback may vary as a function of the camera view angle. This is discussed in more detail later.

While in the robotic arm control state, the control unit 304 continuously monitors the translational and rotational movement of the housing 106 and uses this movement information to generate corresponding output control signals to control the position or velocity of the robotic arm 504. That is, the control unit 304 generates output control signals for robotic arm movement commands and, using the transceiver 306, sends those output control signals to the robotic system 500 which reacts accordingly to set and change the velocity or position of the joints in the robotic arm 504 in accordance with the movement information obtained form the housing 106. Hand controls of this type are well known in the art. For example, six-axis hand controls for sensing motion along six different directions are described in U.S. Pat. No. 6,104,158. By way of example, the magnitude of the displacement of the housing 106 along the Y-axis may determine how far and end-effector 506 on the robotic arm 504 moves forward or backwards. The magnitude of the displacement of the housing 106 along the X-axis may determine left or right movement of the end-effector 506, while Z-axis translations can indicate how high or low the end effector 506 is raised or lowered. Similarly, roll, pitch and yaw information may be used to control corresponding angular movements of the robotic arm 502. Exactly how the translational and rotational movement information of the housing 106 is converted into corresponding output control signals for joint movements of the robotic arm 504 will be a function of the specific embodiment algorithm employed within program code 420. However, in preferred embodiments, while in the robotic arm control mode, the program code 420 does not cause the control unit 304 to send output control signals that would effect movement of the vehicle base 502. That is, the movement information obtained from the housing 106 is used only to control the robotic arm 504 and not the vehicle base 502.

As above, when in the robotic arm control mode, the control unit 304 receives haptic information from the robotic system 500 and uses this haptic information to control forces on the articulating arms 107a, 107b, 108a, 108b, and 109a, 109b that can be experienced by the user. In preferred embodiments, this haptic information relates to the robotic arm 504, and is designed to assist the user in controlling the robotic arm 504. Typically the haptic information may apply forces against the housing 106 that correspond to forces experienced by the robotic arm 504.

While in the robotic arm control mode, the control unit 304 can default to a predetermined video stream for presentation on the display 300 that is most suitable for robotic arm 504 work, such as a video feed from a camera 512 mounted in a forward-facing direction on the end-effector 506. In preferred embodiments, the user can also switch to using different video feeds from other cameras mounted on the robotic system 500.

As indicated above and set forth in more detail below, in some embodiments the output control signals sent by the control unit 304 to control movement of the robotic arm 504 can depend upon the particular video feed presented to the user on the display 300. The following discusses this in more detail. The term "slave device" is used, which may be the robotic arm 504 or vehicle base 502.

Physical displacement of the housing 106 is sensed with respect to a control direction, as discussed earlier, which can have translational and rotational components. The control direction can be any direction that is useful for changing a pose of the slave device (i.e., vehicle base 502 or robotic arm 504). In some embodiments, the linear and rotational axes of the translational and rotational components can be aligned. A first directional translation converts data specifying the control direction to data specifying a slave direction. The slave direction can be different from the control direction and defines a direction that the slave device should move in response to the physical displacement of the housing 106. As with the control direction, the slave direction can generally include linear directions defined with respect to as many as three orthogonal linear axes, and rotational directions defined as many as three rotational axes.

The first directional translation is determined based on a point-of-view of an imaging sensor, such as a video camera, associated with the slave device, which is preferably shown on display 300. For example, the imaging sensor can be the video camera 512 mounted to the end-effector 506 of the robotic arm, or the video camera 514 mounted on the front end of the chassis of the vehicle base 502. The imaging sensor point-of-view information is determined based upon a position and/or an orientation of the imaging sensor. For example, in some embodiments, the orientation of the imaging sensor can vary about as many as three orthogonal axes of rotation (e.g. pitch, roll, and yaw). In some embodiments, the point-of-view can be determined based on a sensed position of one or more movable joints in the robotic arm 504; in other embodiments the point-of-view may in effect be fixed, such as with images sensors fixedly mounted on the vehicle body 502.

The program code 420 causes the CPU 414 to automatically dynamically modify the first directional translation that is performed when the point-of-view is modified. The directional translation can include linear and rotational translations. The imaging sensor point-of-view can be modified by changing the position or orientation of the imaging sensor. The imaging sensor point-of-view can also be modified in response to a user selection of an image obtained from another imaging sensor in place of the first imaging sensor, where the second imaging sensor has a different point-of-view as compared to the first imaging sensor. For example, the user may initially view video on display 300 as received from the first video camera 512 mounted on the end-effector 506, and then subsequently select the second video camera 514 mounted on the vehicle base 502 for viewing on the display 300; as these video cameras 512, 514 will have different point-of-views, directional control of the slave device 502, 504 may be changed based upon these differing points-of-view, and output control signals may be generated accordingly.

One or more sensors associated with the slave device are also used to generate a haptic signal representing, for example, a force applied to the slave device in a sensed direction. The sensed direction can include linear forces defined with respect to as many as three orthogonal linear axes, and rotational forces or torques defined with respect to as many as three rotational axes. Consequently, a second directional translation can be performed to convert data specifying the sensed direction to data specifying a haptic feedback direction, which is then applied to the housing 106. The second directional translation can include directional translation of forces defined with respect to the one or more linear axes, and/or forces defined with respect to the one or more rotational axes. Hence, the second directional translation, which determines how the user feels a haptic effect, is also determined based on a point-of-view of a imaging sensor used to visualize the operations of the slave device 502, 504.

The program code 420 is also configured to cause the CPU 414 to automatically dynamically modify the second directional translation that is performed when the point-of-view is modified. Data representing at least one of the sensed directions and the haptic feedback direction is communicated to the user interface 101 to generate a linear or rotational force on the housing 106.

The directional translation performed for motion control of the slave device 502, 504 and haptic feedback as imparted to the housing 106 can be performed using any suitable method as set forth in program code 420. In this regard, it should be understood that the invention is not limited to any particular mathematical or computational processing. All that is needed is a combination of sensor inputs and processing sufficient to transform motion control commands and/or haptic feedback signals as previously described. Notwithstanding the foregoing, one possible technique for performing the necessary directional translation processing shall hereinafter be described.

As an example, consider the case of the robotic arm 504 that has n joints ($520_1, 520_2, \ldots 520_n$) and an arbitrary number of cameras ($512, 514, \ldots 516$). Let an arbitrary camera 516 be attached to a link of the robotic arm 504 and let there be m joints of the robot arm 504 that are between the camera and the vehicle base 502 of the robot 504. In other words, all joints 1 through m can potentially cause motion of the camera 516, while joints m+1 through n cannot, as they are located at distal points on the robotic arm 504 that extend beyond the location of the camera 516. For each joint i (1≤i≤m) we can define a 3×3 rotation matrix $R_i$ that defines the relative orientation of link i with respect to the vehicle base 502. In general each $R_i$ is a function of the displacement of joint i. Then we define a 3×3 rotation matrix $R_{c/link}$ which defines the relative orientation of the camera coordinate frame (i.e. the camera point of view) with respect to the link it is attached to. Let the velocity of the user's hand be $v_{hand}$ and the velocity of the end-effector 506 of the robotic system 500 be $v_{robot}$:

$$v_{hand} = \begin{pmatrix} \dot{x} \\ \dot{y} \\ \dot{z} \\ \omega_x \\ \omega_y \\ \omega_z \end{pmatrix} \quad (1)$$

$$v_{robot} = \begin{pmatrix} \dot{x} \\ \dot{y} \\ \dot{z} \\ \omega_x \\ \omega_y \\ \omega_z \end{pmatrix}_{robot}$$

where $\dot{x}$, $\dot{y}$, and $\dot{z}$ are linear velocities along the global x, y, and z axes, respectively, and $\omega_x$, $\omega_y$, and $\omega_z$ are angular velocities about the global x, y, and z axes, respectively. Similarly, let the haptic force and torque exerted on the user's hand (by the housing 106) be $F_{hand}$ and the force and torque exerted on the end-effector 506 (by the environment) be $F_{robot}$:

$$F_{hand} = \begin{pmatrix} F_x \\ F_y \\ F_z \\ \tau_x \\ \tau_y \\ \tau_z \end{pmatrix}_{hand} \quad (2)$$

$$F_{robot} = \begin{pmatrix} F_x \\ F_y \\ F_z \\ \tau_x \\ \tau_y \\ \tau_z \end{pmatrix}_{robot}$$

where $F_x$, $F_y$, and $F_z$ are forces along the global x, y, and z axes, respectively, and $\tau_x$, $\tau_y$, and $\tau_z$ are torques about the global x, y, and z axes, respectively. Then the translation of $v_{hand}$ to $v_{robot}$ for camera c is:

$$R_{c/link} \cdot R_m \cdot \ldots \cdot R_2 \cdot R_1 = R_{c,motion} \quad (3)$$

$$v_{robot} = \begin{bmatrix} R_{c,motion} & 0_{3\times3} \\ 0_{3\times3} & R_{c,motion} \end{bmatrix} \cdot v_{hand} \quad (4)$$

Where $0_{3\times3}$ is a 3×3 matrix of zeros. The translation of $F_{robot}$ to $F_{hand}$ for camera c is:

$$R_{c,FT} = R_{c,motion}^T \quad (5)$$

$$F_{hand} = \begin{bmatrix} R_{c,FT} & 0_{3\times3} \\ 0_{3\times3} & R_{c,FT} \end{bmatrix} \cdot F_{robot} \quad (6)$$

The program code 420 may thus be suitably coded employing the above equations to translate housing 106 movement into corresponding output control signals for slave movement based upon the current point-of-view as provided by a video camera and shown on display 300, and similarly translate housing movement 106 into slave movement based upon the current point-of-view as shown on display 300.

In some embodiments the control unit 304 may also support a dual-use mode control state, in which movement information generated by the housing 106 is used to control both the vehicle base 502 and the robotic arm 504. Specifically, the dual-use mode is primarily used to control the robotic arm 504, and hence video feed information for the display 300 may use the same default as used in the robotic arm control state. Also, haptic information for the housing 106 may be made with reference to the robotic arm 504. However, if the user attempts to move or extend the robotic arm 504 beyond what the robotic arm 504 is physically capable of doing, the control unit 304 will generate movement commands for the vehicle base 502 to cause the vehicle base 502 to move in the direction desired by the user for the robotic arm 504. By way of example, if the user is pushing the housing 106 forward along the direction of the Y-axis, but the robotic arm 504 is incapable of further forward movement, the control unit 304 can generate movement commands for the vehicle base 502 that cause the vehicle base 502 to move forward; this movement of the vehicle base 502 can stop when, for example, the user pulls the housing 106 back a predetermined distance along the Y-direction. In that case, the vehicle base 502 becomes substantially closer along the forward direction towards the target position, thereby affording the robotic arm 504 more reach along the Y-axis direction with respect to the target position. As in the other control modes discussed above, the vehicle base 502 and robotic arm 504 control commands can vary as a function of the point-of-view of the video camera being used for display 300 purposes.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. An interface for converting human control input gestures to telematic control signals for controlling a robotic system, the interface comprising:
    a single input device having an elongate hand grip operable by a user to obtain gross hand movement information in a plurality of orthogonal directions;
    at least one sensor configured to measure movement of the elongate hand grip in the plurality of orthogonal directions;
    a control unit responsive to a plurality of sensor signals produced by the at least one sensor for generating output control signals configured to remotely control corresponding movement of the robotic system, the control unit operable to implement a plurality of states comprising:
        a first state in which the output control signals are configured to control unconstrained vehicle motion of a vehicle base portion of the robotic system; and
        a second state in which the output control signals are configured to control a motion of a robotic arm attached to and mechanically supported by the vehicle base portion; and
        a third state in which the output control signals are configured to simultaneously control all operations of the vehicle base portion and the robotic arm; and
    a user actuated sensor coupled to the control unit, wherein the control unit is configured to transition between at least the first state and the second state in response to a first user actuation of said user actuated sensor, and between the second state and the third state in response to a second user actuation of said user actuated sensor.

2. The interface according to claim 1, wherein the single input device comprises:
    a plurality of articulating arms, each mounted at a base end to an interface base and coupled at an opposing end to a housing, said plurality of articulating arms operable for linear translational movement of said housing in three orthogonal directions; and
    a pivot member disposed in said housing arranged to pitch, roll and yaw about a single pivot point;
    wherein the hand grip is attached to said pivot member; and
    wherein the sensor comprises:
        at least one first sensor configured to measure said linear translational movement; and
        at least one second sensor within said housing configured to detect pitch, roll and yaw motion of said pivot member about said pivot point produced by motion of said hand grip.

3. The interface according to claim 1, wherein when in the first state the output control signals are configured to exclusively control the vehicle base portion, and when in the second state the output control signals are configured to exclusively control the robotic arm.

4. The interface according to claim 1, wherein said interface further comprises at least one motive device configured to apply a force to the single input device.

5. The interface according to claim 4, wherein data received from the robotic system is used for controlling said force applied by said at least one motive device to provide haptic feedback to the user of the interface.

6. The interface according to claim 5, wherein said data received from the robotic system relates to a tilt direction and magnitude of the vehicle base portion.

7. The interface according to claim 5, wherein said data received from the robotic system relates to a distance and direction of an object sensed by the robotic system.

8. The interface according to claim 1, further comprising a video display coupled to the control unit for displaying video data received from the robotic system.

9. A method for converting human control input gestures to telematic control signals suitable for controlling a robotic system comprising a vehicle base and a robotic arm coupled to the vehicle base, the method comprising:
    determining movement of an input device in a plurality of orthogonal directions to generate corresponding output control signals;
    selecting one of a plurality of states of a control system in response to a user actuation of a user actuated sensor, wherein
        when in a first state of the plurality of states the output control signals are generated to control unconstrained vehicle motion of the vehicle base of the robotic system,
        when in the second state the output control signals are generated to control the robotic arm attached to and mechanically supported by the vehicle base of the robotic system, and
        when in a third state the output control signals are generated to simultaneously control the vehicle base and robotic arm; and
    sending the output control signals to the robotic system when the first, second or third state is selected.

10. The method according to claim 9, wherein determining movement of the input device comprises:
    determining a linear translation movement of a housing in three orthogonal directions; and
    determining roll, pitch and yaw motion of a pivot member coupled to said housing;
    wherein at least a portion of the linear translation movement, the roll motion, the pitch motion and the yaw motion is used to generate corresponding output control signals.

11. The method according to claim 9, wherein when in the first state the output control signals are used to exclusively control the vehicle base, and when in the second state the output control signals are used to exclusively control the robotic arm.

12. The method according to claim 9, further comprising applying a force to the input device to provide haptic feedback related to the robotic system to a user.

13. The method according to claim 12, wherein the haptic feedback relates to a tilt direction and magnitude of the vehicle base.

14. The method according to claim 12, wherein the haptic feedback relates to a distance and direction of an object sensed by the robotic system.

15. The method according to claim 9, further comprising utilizing a point-of-view of an image presented on a video display to generate the output control signals in accordance with the point-of-view.

\* \* \* \* \*